(12) United States Patent
Lai et al.

(10) Patent No.: US 9,158,405 B2
(45) Date of Patent: Oct. 13, 2015

(54) ELECTRONIC DEVICE INCLUDING TOUCH-SENSITIVE DISPLAY AND METHOD OF CONTROLLING SAME

(75) Inventors: Jackson Chi Sun Lai, Mississauga (CA); Qian Q. W. Wang, Waterloo (CA)

(73) Assignee: BlackBerry Limited, Waterloo (CA)

( * ) Notice: Subject to any disclaimer, the term of this patent is extended or adjusted under 35 U.S.C. 154(b) by 236 days.

(21) Appl. No.: 13/524,332

(22) Filed: Jun. 15, 2012

(65) Prior Publication Data

US 2013/0335338 A1  Dec. 19, 2013

(51) Int. Cl.
  *G06F 3/045* (2006.01)
  *G06F 3/041* (2006.01)
  *G06F 3/044* (2006.01)

(52) U.S. Cl.
  CPC .............. *G06F 3/0412* (2013.01); *G06F 3/044* (2013.01)

(58) Field of Classification Search
  CPC ...... G06F 3/0412; G06F 3/044; G06F 3/0416; G02F 1/13338
  USPC .......................................... 345/104, 173, 174
  See application file for complete search history.

(56) References Cited

U.S. PATENT DOCUMENTS

| | | | |
|---|---|---|---|
| 2002/0044208 A1* | 4/2002 | Yamazaki et al. | 348/272 |
| 2006/0077186 A1* | 4/2006 | Park et al. | 345/173 |
| 2009/0207154 A1* | 8/2009 | Chino | 345/175 |
| 2010/0026636 A1* | 2/2010 | Jang et al. | 345/173 |
| 2012/0113045 A1* | 5/2012 | Lai | 345/174 |
| 2012/0162121 A1* | 6/2012 | Chang et al. | 345/174 |
| 2012/0249474 A1* | 10/2012 | Pratt et al. | 345/174 |
| 2012/0256861 A1* | 10/2012 | Park | 345/173 |

FOREIGN PATENT DOCUMENTS

| | | |
|---|---|---|
| EP | 1455264 A2 | 9/2004 |
| GB | 2475055 A | 5/2011 |
| WO | 2007/146779 A2 | 12/2007 |

OTHER PUBLICATIONS

Extended European Search Report dated Dec. 17, 2012 issued in respect of corresponding European Patent Application No. 12172312.6.

Copy of Communication pursuant to Article 94(3) EPC dated Aug. 26, 2014, issued in respect of corresponding European Patent Application No. 12172312.6.

* cited by examiner

*Primary Examiner* — Koosha Sharifi-Tafreshi
(74) *Attorney, Agent, or Firm* — Geoffrey deKleine; Borden Ladner Gervais LLP

(57) ABSTRACT

A method includes exciting a first gate line of a touch-sensitive display to control display of information, driving a first scanning electrode of the touch-sensitive display while exciting the gate line, wherein the first gate line is associated with a first area of the display and the first scanning electrode is associated with a second area of the display, which second area is spaced from the first area.

10 Claims, 3 Drawing Sheets

ELECTRONIC DEVICE INCLUDING TOUCH-SENSITIVE DISPLAY AND METHOD OF CONTROLLING SAME

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
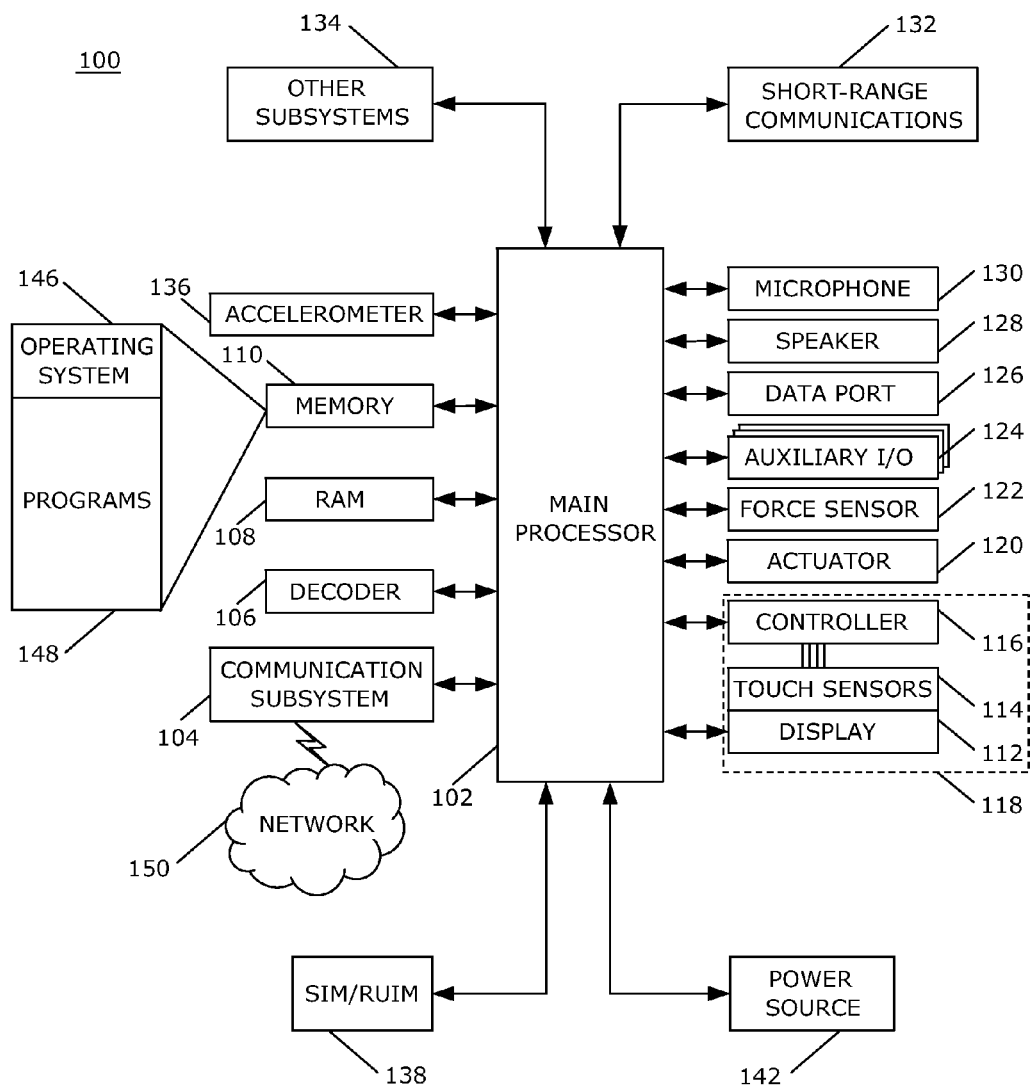
FIG. 1 is a block diagram of a portable electronic device in accordance with the disclosure.

The following describes an electronic device and a method of controlling a touch-sensitive display of the electronic device. The method includes exciting a first gate line of a touch-sensitive display to control display of information, driving a first scanning electrode of the touch-sensitive display while exciting the gate line, wherein the first gate line is associated with a first area of the display and the first scanning electrode is associated with a second area of the display, which second area is spaced from the first area.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display that includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus (active or passive), pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
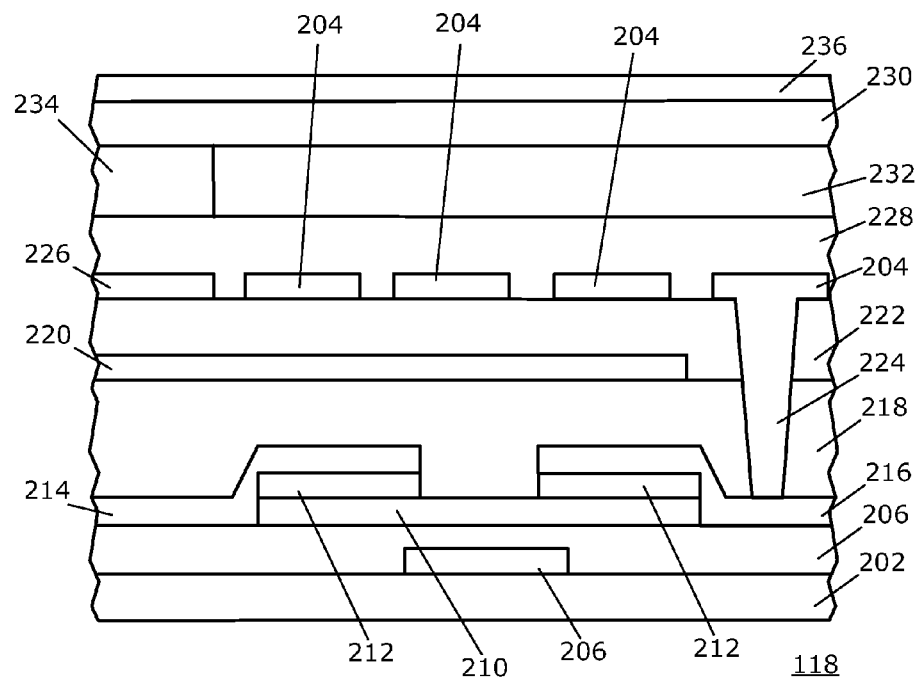
FIG. 2 is a partial cross section of one example of a touch-sensitive display in accordance with the disclosure.

A partial cross section of one example of an in-cell touch-sensitive display 118 is shown in FIG. 2. In the example illustrated in FIG. 2, the touch-sensitive display 118 comprises an In-Plane Switching (IPS) liquid crystal display (LCD) that includes a thin-film transistor (TFT) structure and a color filter. The TFT structure includes a glass substrate 202 and intervening layers between the glass substrate and pixel electrodes 204. The glass substrate 202 and the intervening layers provide the substrate on which the pixel electrodes 204 are disposed. The intervening layers include gate lines 206, a gate insulator 208, amorphous silicon semiconductor film 210, n-type amorphous silicon ($n^+$-a-Si) film 212, source/drain electrodes 214, 216, a lower insulator 218, also known as an inter-layer dielectric (ILD), common electrodes 220, and an upper insulator 222. The LCD display is not limited to an amorphous silicon display. The LCD display may alternatively be fabricated using other large area electronics technology such as low-temperature polysilicon (LTPS), metal oxide semiconductor, or organic back-plane display.

The pixel electrodes 204 are disposed along the upper insulator 222 and are spaced apart in an array on the upper insulator 222. The pixel electrodes 204 may be coupled to the source/drain electrodes 214/216 utilizing vias 224 that extend from the pixel electrodes 204 to the source/drain electrodes 214/216. The gate lines 206 are electrically coupled to the pixel electrodes 204 to control the display of information by controlling the excitation of the gate lines 206.

In the example of FIG. 2, scanning electrodes 226, also known as drive electrodes, that are utilized for mutual capacitive touch sensing are interspersed with the pixel electrodes 204. The scanning electrodes 226 are spaced from the pixel electrodes 204 to electrically isolate the scanning electrodes 226 from the pixel electrodes 204.

Display material, which is liquid crystal 228 in the example of an IPS LCD, is disposed between the pixel electrodes 204 and the color filter. The color filter includes color filter material 232 and black matrix material 234 disposed on the glass substrate 230. The RGB (red-green-blue) elements of the color filter are separated by black matrix material 234. The black matrix material 234 is disposed on the glass substrate 230 where the color filter material 232 is not disposed.

The scanning electrodes 226 are aligned with the black matrix material 234 such that the scanning electrodes 226 are located under the black matrix material 234 of the touch-sensitive display 118 in the orientation illustrated in FIG. 2. The scanning electrodes 226 are electrically separated from the pixel electrodes 204 to reduce noise.

Sense electrodes 236, also known as receiving electrodes, that are utilized for mutual capacitive touch sensing are disposed on the color filter such that the color filter is adjacent to the sense electrodes 236 and the sense electrodes 236 extend over the black matrix material 234. The sense electrodes 236 may be wide compared to the spacing between the sense electrodes 236 and compared to the scanning electrodes 226 to facilitate shielding of the touch-sensitive display 118. The sense electrodes 236 shield the display 112 from an external electric field, for example, from the environment, from electrical connections, or from other sources. The touch-sensitive display 118 may also include polarizers (not shown).

The upper insulator 222 is disposed between the common electrodes 220 and the pixel electrodes 204. The common electrodes 220 and the pixel electrodes 204 are display electrodes that control the liquid crystal 228. The data from the scanning electrodes 226 and the sense electrodes 236 is utilized to detect a touch on the touch-sensitive display 118. The pixel electrodes 204, the common electrodes 220, the scanning electrodes 226, and the sense electrodes 236 may comprise any suitable material, such as indium tin oxide (ITO).

The scanning electrodes 226 are generally parallel to each other and extend across the touch-sensitive display 118. The sense electrodes 236 are also generally parallel to each other and extend across the touch-sensitive display 118 such that the scanning electrodes 226 extend generally perpendicular to the sense electrodes 236 to form a grid pattern. The scanning electrodes 226 and the sense electrodes 236 cross over the scanning electrodes 226 at multiple locations that are utilized to detect a touch. Rather than generally parallel lines, the sense electrodes may alternatively be disposed in any other suitable shape or pattern.

The scanning electrodes 226 may be routed to the sides of the array to couple to the controller 116. For example, the scanning electrodes 226 may be routed to alternating sides of the array. Alternatively, the scanning electrodes 226 may be routed to one side of the array.

The scanning electrodes 226 and the sense electrodes 236 are coupled to the controller 116 and the gate lines 206 may be coupled to the controller 116. Alternatively, the gate lines 206 may be coupled to a separate controller, referred to as a display controller or display driver. The display controller may be coupled to the touch controller 116, to facilitate communication and to control and coordinate excitation of the gate lines 206 and the scanning electrodes 226. The gate lines 206 extend generally across the display 118 and parallel to the scanning electrodes 226.

The scanning electrodes 226 are driven with a drive signal that is controlled by the controller 116. The sense electrodes 236 are utilized to measure the changes in electric field caused by an input member such as a finger touching the touch-sensitive display 118.

FIG. 2 illustrates one example of a touch-sensitive display 118. Alternatively, other touch-sensitive displays, such as other in-cell touch-sensitive displays or on-cell touch-sensitive displays, may utilize the present method.

The gate lines are excited in sequence and scanning electrodes are driven in sequence. The scanning electrodes 226 are driven with a drive signal that may be controlled by the controller 116. The sense electrodes 236 are utilized to measure the changes in electric field, e.g., caused by an input member touching the touch-sensitive display 118.

Scanning electrodes 226 may be driven during the horizontal blanking time and the vertical blanking time, when the gate electrodes 206 and data lines 212 are not switching. During blanking times, coupling and interference with touch sensing are reduced, facilitating enhanced touch sensing signal-to-noise ratio. The length of time available for touch sensing is affected by the horizontal and vertical blanking times in such electronic devices. Thus, the number of pulses and frequency of touch sensing is constrained.

Figure 3:
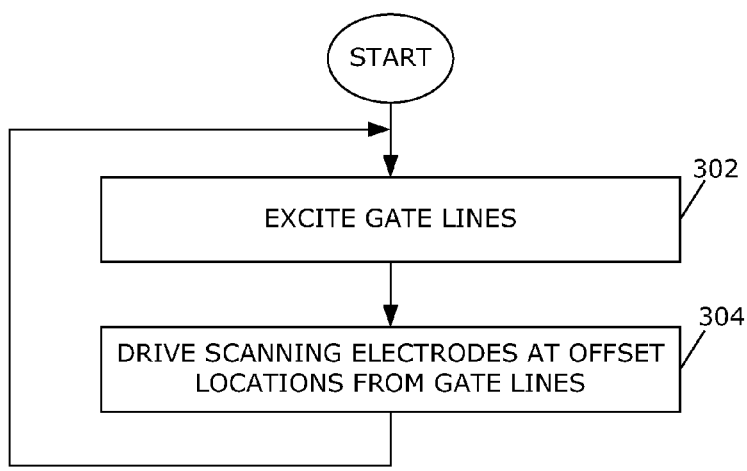
FIG. 3 is a flowchart illustrating a method of controlling a touch-sensitive display in accordance with the disclosure.

A flowchart illustrating a method of controlling a touch-sensitive display 118 is illustrated in FIG. 3. The method may be carried out by software executed, for example, by the controller 116. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, such as a non-transitory computer-readable medium.

One of the gate lines 206 is excited 302. The gate line 206 is associated with an area of the touch-sensitive display 118 as the gate line 206 is utilized to control the display of information in the area with which the one gate line 206 is associated.

One of the scanning electrodes 226 that is offset from the gate line 206 is driven 304 at or about the same time that one of the gate lines 206 is excited at 302. The scanning electrode 226 is associated with an area of the touch-sensitive display 118 and is utilized for detection of touches associated with the area of the touch-sensitive display 118. The touch-sensitive display 118 area that is associated with the gate line 206 is offset or spaced from the area of the touch-sensitive display 118 that is associated with the scanning electrode 226. The scanning electrode 226 is driven by a drive signal while the gate line 206 is excited.

Because the areas associated with the gate line 206 and the scanning electrode 226 are offset or spaced apart on the touch-sensitive display 118, coupling and interference with touch sensing that is caused by excitation of the gate line 206 is reduced.

The scanning electrode 226 may also be driven during the horizontal blanking time and during the vertical blanking time when the gate lines 206 are not excited. The frequency of driving the scanning electrode 226 may be greater than the frequency of excitation of the gate line 206 to increase accuracy of touch detection. Thus, each scanning electrode 226 may be driven more frequently than the frequency of excitation of each gate line 206.

The gate lines 206 are excited one at a time in sequence until excitation of each gate line 206 is carried out. For example, the gate lines 206 may be excited in sequence from top to bottom or from one side to an opposing side of the touch-sensitive display 118, depending on the orientation of the gate lines 206. After each gate line 206 is excited, the process of exciting each gate line 206 repeats.

The scanning electrodes 226 are also driven one at a time, in sequence during touch sensing, also referred to as scanning the touch-sensitive display 118. For example, the scanning electrodes 226 may be excited in sequence from top to bottom or from one side to an opposing side of the touch-sensitive display, depending on the orientation of the scanning electrodes 226. Each of the scanning electrodes 226 may be driven and driving of the scanning electrodes 226 is repeated.

The timing of excitation of the gate lines 206 and driving the scanning electrodes 226 is controlled to maintain an offset or spacing between areas associated with each gate line 206 and the corresponding scanning electrode 226 that is driven while the gate line 206 is excited. Thus, when a gate line 206 that is associated with an area of the touch-sensitive display is excited, a scanning electrode 226 that is associated with the same area of the touch-sensitive display 118 is not driven.

The scanning rate of the touch-sensitive display 118 may be dynamically adjusted, thereby adjusting the reporting rate to reduce noise introduced, for example, during charging of a battery of the electronic device 100.

Figure 4:
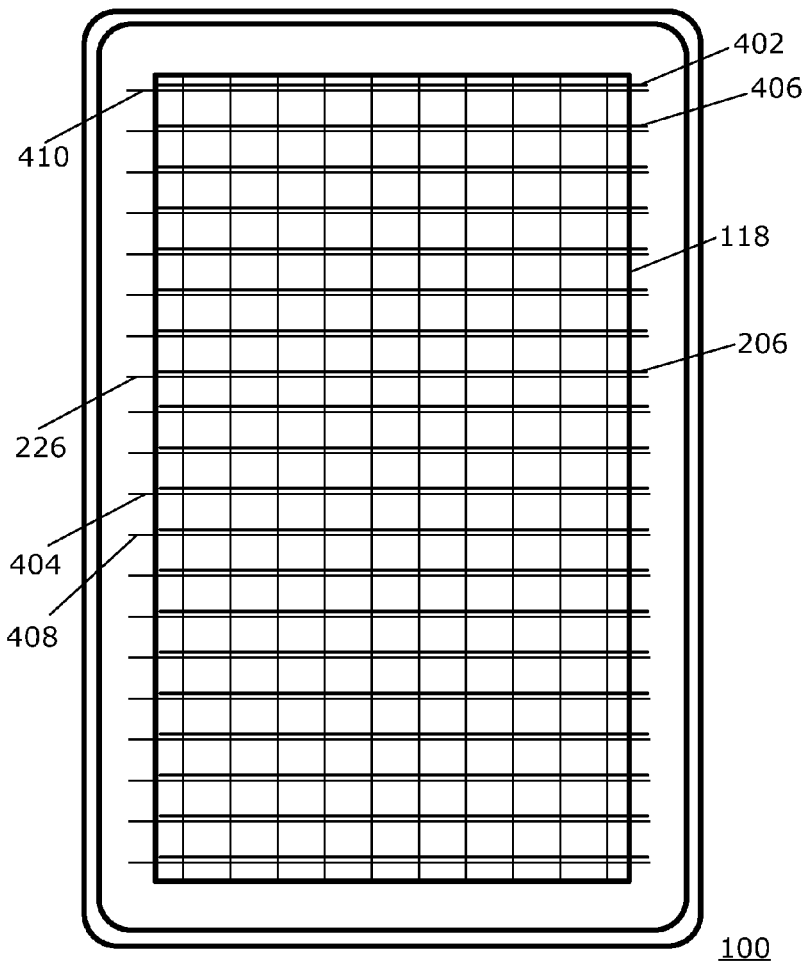
FIG. 4 is a front view of a portable electronic device in accordance with the disclosure.

A front view of a portable electronic device 100 is shown in FIG. 4. The scanning electrodes 226 and the gate lines 206 are shown in FIG. 4 for the purpose of illustration, but are not visible to the eye when viewing the portable electronic device 100 from the front. The gate lines 206 are illustrated as thicker lines than the scanning electrodes 206 and are offset from the scanning electrodes 226 to distinguish between the gate lines 206 and the scanning electrodes 226 in the drawing. The gate lines 206 and the scanning electrodes 226 may be the same thickness and may not be offset. The terms "top" and "bottom" are utilized herein to refer to the orientation of the portable electronic device 100 in the figures and are not otherwise limiting. In the example of FIG. 4, excitation of gate lines 206 begins with excitation of the gate line 402 at a top of the touch-sensitive display 118. The gate line 402 at the top of the touch-sensitive display 118 is associated with a top area of the touch-sensitive display 118. Touch sensing begins with driving a scanning electrode 404 near the centerline between top and bottom of the touch-sensitive display 118. In this example, the scanning electrode 404 is associated with an area of the touch-sensitive display 118 near the centerline. The area associated with the gate line 402 that is excited and the area associated with the scanning electrode 404 that is driven are offset by about one half the distance from top to bottom of the touch-sensitive display 118, such as shown in FIG. 4. Other offsets or spacing may be utilized. The scanning electrode 410 that is closest to the gate line 402 and is associated with the same area of the touch-sensitive display 118 that the gate line 402 is associated with is not driven when the gate line 402 is excited.

After exciting the top gate line 402, the next gate line 406 is excited and the next scanning electrode 408 is driven. The area associated with the gate line 406 is spaced from the area associated with the scanning electrode 408.

By controlling timing of exciting the gate lines 206 in sequence from top to bottom and driving the scanning electrodes 226 in sequence from the centerline to the bottom and then from the top to the center, an offset is maintained during display refresh and touch-sensing.

Figure 5:
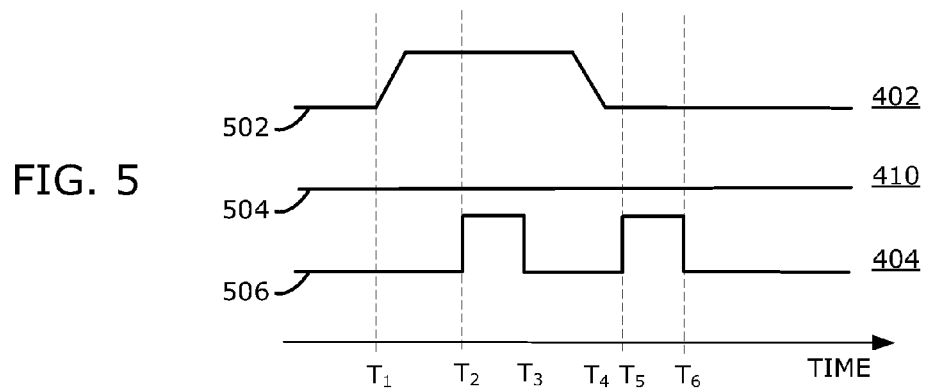
FIG. 5 is a diagram illustrating timing of exciting gate lines and driving electrodes of the touch-sensitive display in accordance with the disclosure.

Signal timing diagrams illustrating timing of exciting the gate line 402 and driving the scanning electrode 404 are shown in FIG. 5. As illustrated by the signal 502, the gate line 402 is excited between time T1 and time T4. The time between time T5 and time T6 is a time during which none of the gate lines 206 are excited. As illustrated by the signal 506, the scanning electrode 404 is driven and one of the sense electrodes 236 is utilized for sensing between time T2 and time T3, which falls in the time period between time T1 and time T4, while the gate line 402 is excited. The scanning electrode 404 is associated with an area of the display 118 that is offset of spaced from the area of the display that the gate line 402 is associated with. The scanning electrode 404 is also driven during the horizontal blanking time between time T3 and time T4. The scanning electrode 410 that is associated with the area with which the gate line 402 is associated, is not driven while the gate line 402 is excited, as illustrated by the signal 504.

A method includes exciting a first gate line of a touch-sensitive display to control display of information, driving a first scanning electrode of the touch-sensitive display while exciting the gate line, wherein the first gate line is associated with a first area of the display and the first scanning electrode is associated with a second area of the display, which second area is spaced from the first area.

An electronic device includes a touch-sensitive display comprising gate lines including a first gate line associated with a first area of the touch-sensitive display, scanning electrodes including a first scanning electrode associated with a second area of the touch-sensitive display, sense electrodes spaced from the scanning electrodes, and at least one controller coupled to the scanning electrodes, the sense electrodes, and the gate lines, and configured to control the display of information and sense a touch on the touch-sensitive display by exciting the first gate line, and driving the first scanning electrode while exciting the first gate line, wherein the second area is spaced from the first area.

A method includes sequentially exciting gate lines of a touch-sensitive display to control display of information, and sequentially driving scanning electrodes of the touch-sensitive display while exciting the gate lines, wherein when a first gate line is excited while driving a first scanning electrode, and the first gate lines and the first scanning electrode are associated with different areas of the display.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   sequentially exciting gate lines coupled to pixel electrodes of a touch-sensitive display to control display of information on the touch-sensitive display;
   driving scanning electrodes to detect touches detecting touches on the touch-sensitive display using mutual capacitance touch sensing by:
   sensing utilizing sense electrodes and driving scanning electrodes while exciting gate lines; and
   sensing utilizing the sense electrodes and driving scanning electrodes during blanking times of the touch-sensitive display in which the gate lines are not excited such that each scanning electrode is driven more frequently than the frequency of excitation of each gate line;
   wherein each one of the gate lines is excited while driving a respective one of the scanning electrodes, and for each gate line that is excited while the respective one of the scanning electrodes is driven, a plurality of the gate lines and a plurality of the scanning electrodes are disposed between the gate line that is excited and the respective scanning electrode that is driven such that each gate line that is excited is spaced from each scanning electrode that is driven at the same time by other gate lines and scanning electrodes, to facilitate mutual capacitance touch sensing while exciting gate lines.

2. The method according to claim 1, wherein each one of the gate lines is separated from the respective one of the scanning electrodes by a distance of about one half of the display.

3. The method according to 1, wherein a scanning rate of the touch-sensitive display is dynamically adjusted.

4. The method according to claim 1, wherein a first scanning electrode is adjacent a first gate line that is excited and is not separated from the first gate line that is excited by other gate lines and scanning electrodes, and the first scanning electrode is not driven while the adjacent first gate line is excited.

5. A non-transitory computer-readable storage medium having computer-readable code executable by at least one processor of a portable electronic device to perform the method of claim 1.

6. An electronic device comprising:
a touch-sensitive display comprising:
gate coupled to pixel electrodes to control display of information on the touch-sensitive display;
scanning electrodes and sense electrodes spaced from the scanning electrodes to detect touches on the touch-sensitive display;
at least one controller coupled to the scanning electrodes, the sense electrodes, and the gate lines, and configured to control the display of information by:
sequentially exciting gate lines;
driving scanning electrodes to detect touches by:
sensing utilizing the sense electrodes and driving the scanning electrodes while exciting the gate lines; and
sensing utilizing the sense electrodes and driving the scanning electrodes during blanking times of the touch-sensitive display in which the gate lines are not excited such that each scanning electrode is driven more frequently than the frequency of excitation of each gate line;
wherein each one of the gate lines is excited while driving a respective one of the scanning electrodes, and for each gate line that is excited while the respective one of the scanning electrodes is driven, a plurality of the gate lines and a plurality of the scanning electrodes are disposed between the gate line that is excited and the respective scanning electrode that is driven such that each gate line that is excited is spaced from each scanning electrode that is driven at the same time by other gate lines and scanning electrodes, to facilitate mutual capacitance touch sensing while exciting gate lines.

7. The electronic device according to claim 6, wherein each one of the gate lines is separated from the respective one of the scanning electrodes by a distance of about one half of the display.

8. The electronic device according to claim 6, wherein a scanning rate of the touch-sensitive display is dynamically adjusted.

9. The electronic device according to claim 6, wherein a first scanning electrode is adjacent a first gate line that is excited and is not separated from the first gate line that is excited by other gate lines and scanning electrodes, and the first scanning electrode is not driven while the adjacent first gate line is excited.

10. The electronic device according to claim 6, wherein the touch-sensitive display is an in-cell touch-sensitive display or an on-cell touch-sensitive display.

* * * * *